United States Patent [19]
Wu

[11] Patent Number: 5,926,312
[45] Date of Patent: Jul. 20, 1999

[54] FOLDABLE BINOCULARS

[76] Inventor: Kuo-Chen Wu, No. 322, Taming Rd., Tali City, Taichung Hsien, Taiwan

[21] Appl. No.: 09/075,784

[22] Filed: May 12, 1998

[51] Int. Cl.$^6$ ............................. G02B 23/00; G02B 27/02
[52] U.S. Cl. ............................................ 359/408; 359/480
[58] Field of Search .................................... 359/407, 408, 359/474, 480, 481, 482, 817

[56] References Cited

U.S. PATENT DOCUMENTS

| | | | |
|---|---|---|---|
| 2,002,782 | 5/1935 | Lester | 359/408 |
| 4,964,709 | 10/1990 | Hoeptner | 359/408 |
| 5,206,757 | 4/1993 | Cheng et al. | 359/408 |
| 5,483,301 | 1/1996 | Clarke | 351/41 |

*Primary Examiner*—Thong Nguyen
*Assistant Examiner*—Mark A. Robinson
*Attorney, Agent, or Firm*—Bacon & Thomas, PLLC

[57] ABSTRACT

A kind of foldable binoculars includes a substantially L-shaped first bracket including a first bottom plate having a first side and a second side, and a first side plate defining two first viewing holes and having a first side extending from the second side of the first bottom plate and a second side. A substantially L-shaped second bracket includes a second bottom plate having a first side pivotally connected with the second side of the first side plate and a second side, and a second side plate defining two second viewing holes and having a first side extending from the second side of the second bottom plate and a second side pivotally connected with the first side of the first bottom plate. Two concave lenses are each mounted on a corresponding one of the two second viewing holes. An adjusting member is movably mounted between the first bracket and the second bracket and defines two third viewing holes each aligning with a corresponding one of the two first viewing holes and each aligning with a corresponding one of the two second viewing holes. Two convex lenses are each detachably mounted on a corresponding one of the two third viewing holes.

15 Claims, 4 Drawing Sheets

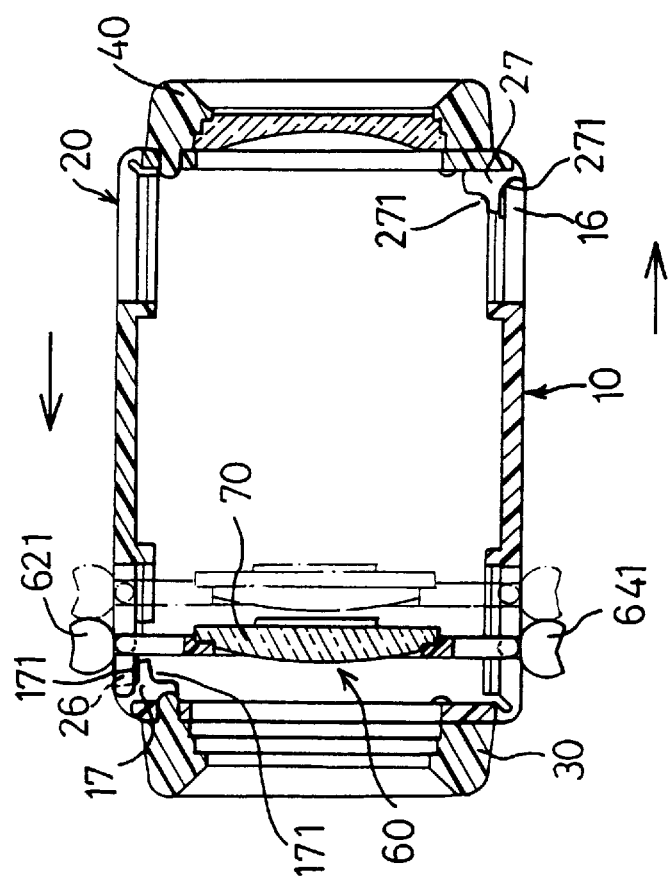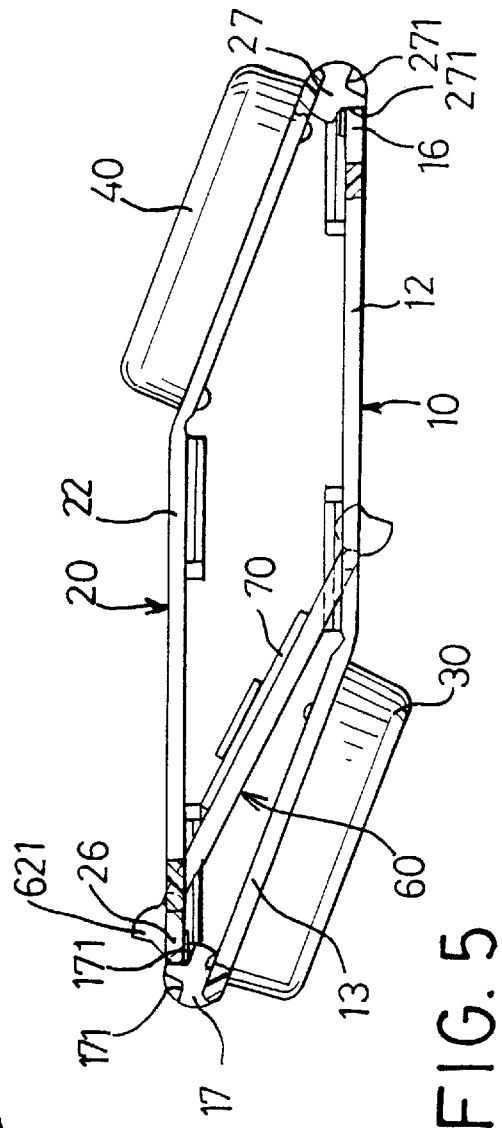

FOLDABLE BINOCULARS

FIELD OF THE INVENTION

The present invention relates to foldable binoculars.

BACKGROUND OF THE INVENTION

Conventional binoculars can be adapted to be used in places such as a baseball field, a theater, an opera house etc. for providing a user with a clearer view. By such an arrangement, however, the focal length of the conventional binoculars is fixed and cannot be adjusted arbitrarily, thereby greatly limiting the versatility of the binoculars. In addition, the binoculars have to be assembled in a factory and will occupy a considerable space when being assembled, thereby greatly increasing the cost in transportation. In addition, the binoculars cannot be assembled by a user, thereby incurring a cost in packaging. Further, the binoculars cannot be collapsed, thereby causing an inconvenience in transportation.

The present invention has arisen to mitigate and/or obviate the disadvantage of the conventional binoculars.

SUMMARY OF THE INVENTION

In accordance with one aspect of the present invention, there is provided a pair of foldable binoculars comprising a substantially L-shaped first bracket including a first bottom plate having a first side and a second side, and a first side plate defining two spaced first viewing holes and having a first side extending from the second side of the first bottom plate and a second side.

A substantially L-shaped second bracket includes a second bottom plate having a first side pivotally connected with the second side of the first side plate of the first bracket and a second side, and a second side plate having a first side extending from the second side of the second bottom plate and a second side pivotally connected with the first side of the first bottom plate of the first bracket, wherein the second side plate defines two spaced second viewing holes each aligning with a corresponding one of the two first viewing holes. Two concave lenses are each mounted on a corresponding one of the two second viewing holes.

An adjusting member is movably mounted between the first bracket and the second bracket and defines two spaced third viewing holes each aligning with a corresponding one of the two first viewing holes and each aligning with a corresponding one of the two second viewing holes. Two convex lenses are each detachably mounted on a corresponding one of the two third viewing holes.

Further features of the present invention will become apparent after a careful reading of the detailed description with appropriate reference to the accompanying drawings.

BRIEF DESCRIPTION OF THE DRAWINGS

FIG. 3 is a side cross-sectional view of the foldable binoculars as shown in FIG. 2;

FIG. 5 is an operational view of FIG. 3.

DETAILED DESCRIPTION OF THE PREFERRED EMBODIMENTS

Figure 1:
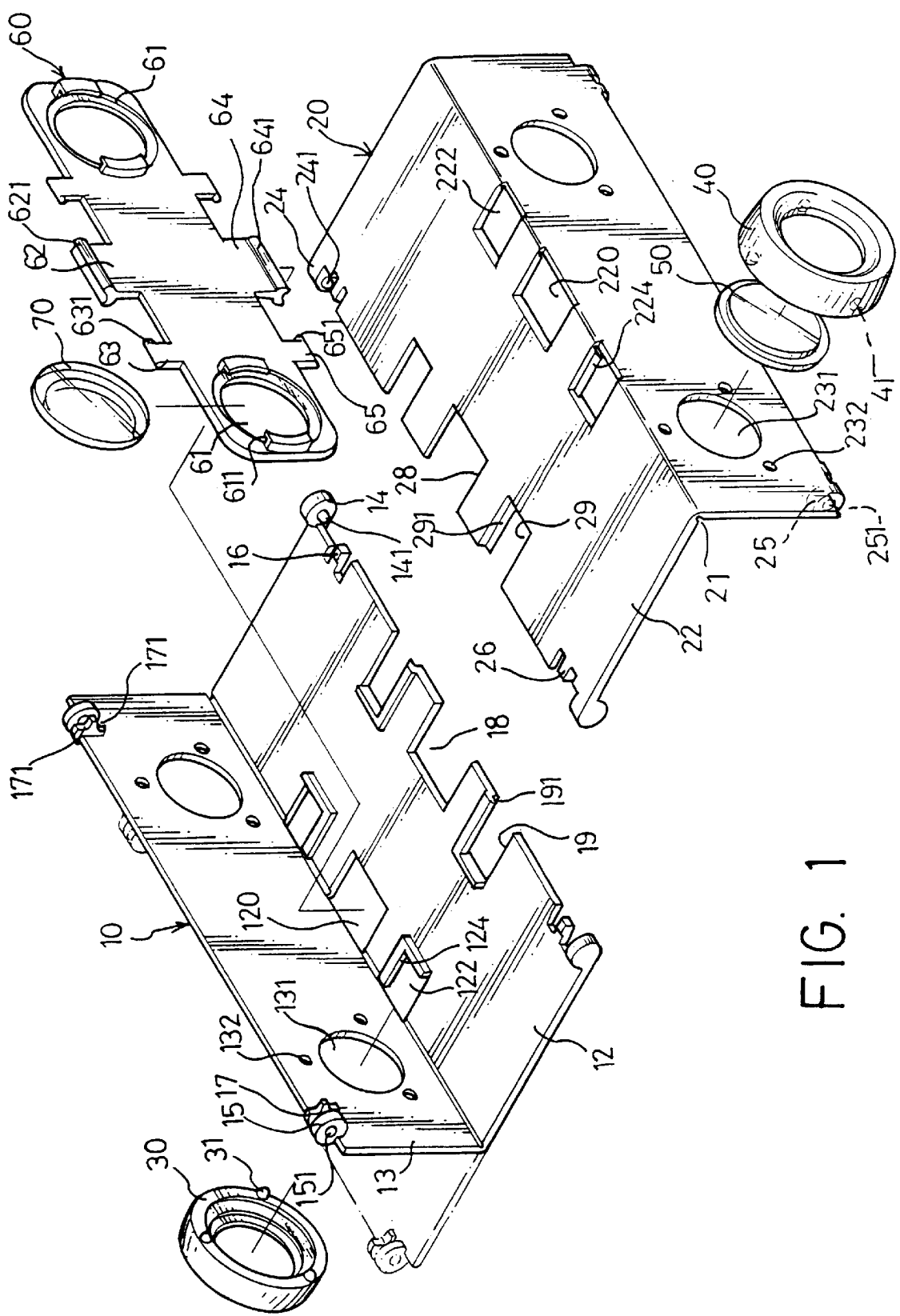
FIG. 1 is an exploded view of foldable binoculars in accordance with the present invention.

Referring to the drawings and initially to FIGS. 1–4, foldable binoculars 1 in accordance with the present invention comprise a substantially L-shaped flexible first bracket 10 including a first bottom plate 12 having a first side and a second side, and a first side plate 13 defining two spaced first viewing holes 131 and having a first side extending from the second side of the first bottom plate 12 and a second side. An elongate slit 11 is defined between the second side of the first bottom plate 12 and the first side of the first side plate 13 such that the first side plate 13 can be pivoted relative to the first bottom plate 12.

Two objective carriers 30 are each fixedly mounted on the first side plate 13 for aligning with a corresponding one of the two first viewing holes 131 and are each formed with three bosses 31 each securely fitted in a respective bore 132 defined in the first side plate 13 located adjacent to the first viewing hole 131.

A substantially L-shaped flexible second bracket 20 includes a second bottom plate 22 having a first side pivotally connected with the second side of the first side plate 13 of the first bracket 10 and a second side, and a second side plate 23 having a first side extending from the second side of the second bottom plate 22 and a second side pivotally connected with the first side of the first bottom plate 12 of the first bracket 10, wherein the second side plate 23 defines two spaced second viewing holes 231 each aligning with a corresponding one of the two first viewing holes 131. An elongate slit 21 is defined between the second side of the second bottom plate 22 and the first side of the second side plate 23 such that the second side plate 23 can be pivoted relative to the second bottom plate 22.

Two concave lenses 50 are each mounted on a corresponding one of the two second viewing holes 231. Two eyepiece carriers 40 are each fixedly mounted on the second side plate 23 of the second bracket 20 for retaining a corresponding one of the two concave lenses 50 therein and are each formed with three bosses 41 each securely fitted in a respective bore 232 defined in the second side plate 23 located adjacent to the second viewing hole 231.

The second side of the first side plate 13 includes two end portions each formed with a pivot base 15 transversely defining a pivot hole 151, and the first side of the second bottom plate 22 includes two end portions each formed with a pivot ear 24 which is formed with a stub 241 pivotally received in the pivot hole 151 of a corresponding one of the two end portions of the second side of the first side plate 13 such that the second bottom plate 22 can be pivotally connected with the first side plate 13.

Each of the two end portions of the second side of the first side plate 13 is formed with a substantially T-shaped retaining base 17 defining two retaining recesses 171, and each of the two end portions of the first side of the second bottom plate 22 is formed with an elastic piece 26 detachably received in one of the two retaining recesses 171 of a corresponding one of the two end portions of the second side of the first side plate 13.

The second side of the second side plate 23 includes two end portions each formed with a pivot base 25 transversely defining a pivot hole 251, and the first side of the first bottom plate 12 includes two end portions each formed with a pivot ear 14 which is formed with a stub 141 pivotally received in the pivot hole 251 of a corresponding one of the two end portions of the second side of the second side plate 23 such that the second side plate 23 can be pivotally connected with the first bottom plate 12.

Each of the two end portions of the second side of the second side plate 23 is formed with a substantially T-shaped retaining base 27 (see FIG. 3) defining two retaining recesses 271, and each of the two end portions of the first side of the first bottom plate 12 is formed with an elastic piece 16 detachably received in one of the two retaining recesses 271 of a corresponding one of the two end portions of the second side of the second side plate 23.

An adjusting member 60 is movably mounted between the first bracket 10 and the second bracket 20 and defines two spaced third viewing holes 61 each aligning with a corresponding one of the two first viewing holes 131 and aligning with a corresponding one of the two second viewing holes 231.

Two convex lenses 70 are each detachably mounted on a corresponding one of the two third viewing holes 61. Each of the two third viewing holes 61 includes two substantially L-shaped arcuate hooks 611 each radially extending inwardly for retaining a corresponding one of the two convex lenses 70 therein.

The first side of the second bottom plate 22 defines two spaced first guide grooves 29, the second side of the first bottom plate 12 defines two spaced second guide grooves 122 each aligning with a corresponding one of the two first guide grooves 29, and the adjusting member 60 includes a first side formed with two flexible first slides 63 each slidably received in a corresponding one of the two first guide grooves 29, and a second side formed with two flexible second slides 65 each slidably received in a corresponding one of the two second guide grooves 122.

Each of the two first guide grooves 29 includes a first guide track 291 formed therein, and each of the two first slides 63 is formed with a flexible first lug 631 guided by the first guide track 291 of a corresponding one of the two first guide grooves 29. Each of the two second guide grooves 122 includes a second guide track 124 formed therein, and each of the two second slides 65 is formed with a flexible second lug 651 guided by the second guide track 124 of a corresponding one of the two second guide grooves 122.

The first side of the second bottom plate 22 defines a first opening 28, the second side of the first bottom plate 12 defines a second opening 120 aligning with the first opening 28, and the first side of the adjusting member 60 is formed with a pushing piece 62 slidably received in the first opening 28, and the second side thereof is formed with a second pushing piece 64 slidably received in the second opening 120. The first pushing piece 62 is formed with a first large head 621, and the second pushing piece 64 is formed with a second large head 641.

By such an arrangement, the adjusting member 60 can be slidably mounted between the first side of the second bottom plate 22 and the second side of the first bottom plate 12.

Similarly, a third opening 18 and two adjacent third guide grooves 19 each formed with a third guide track 191 are respectively defined in the first side of the first bottom plate 12, and a fourth opening 220 and two adjacent fourth guide grooves 222 each formed with a fourth guide track 224 are respectively defined in the second side of the second bottom plate 22 such that the adjusting member 60 can be slidably mounted between the second side of the second bottom plate 22 and the first side of the first bottom plate 12.

Figure 2:
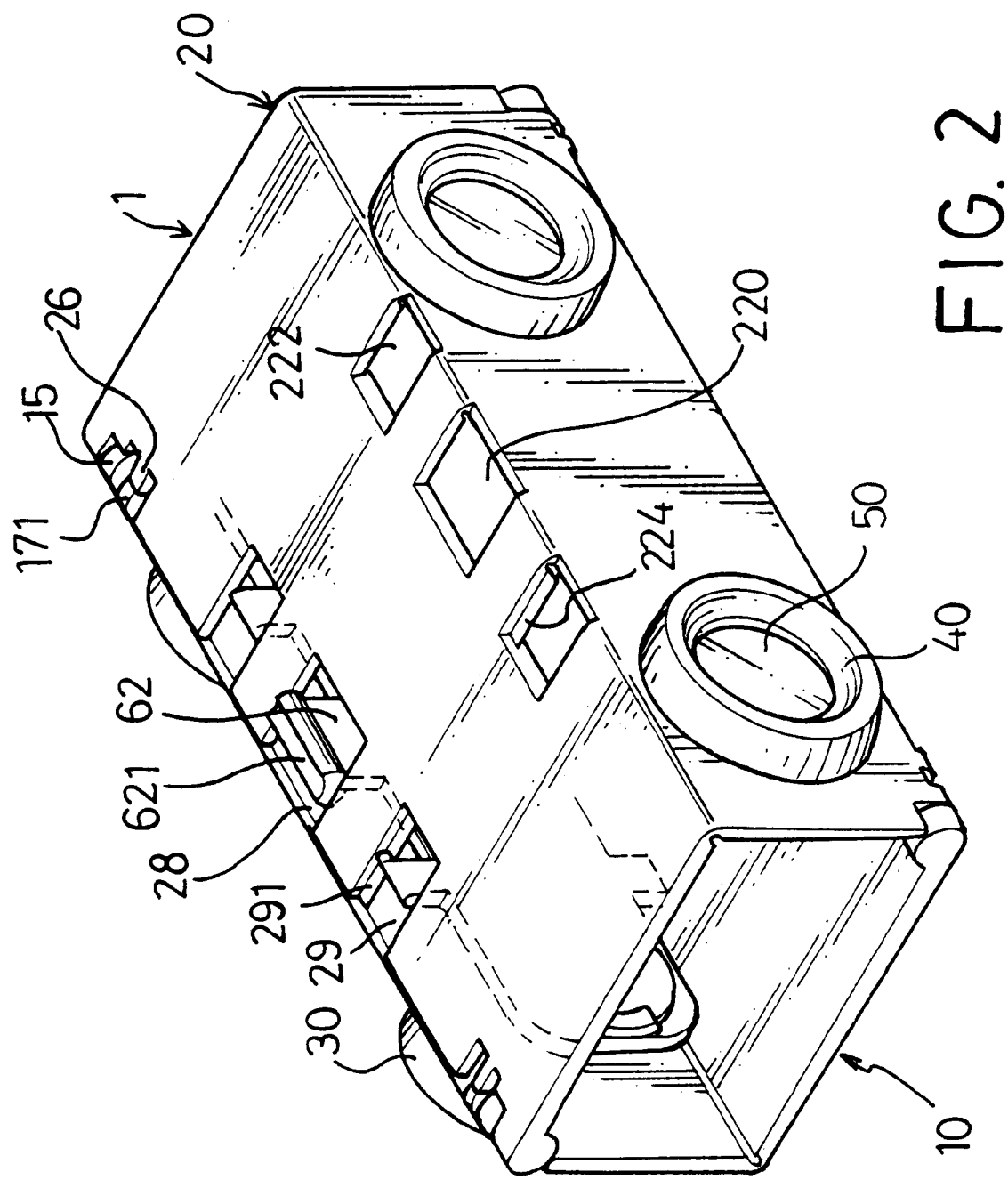
FIG. 2 is a perspective assembly view of the foldable binoculars as shown in FIG. 1.
Figure 4:
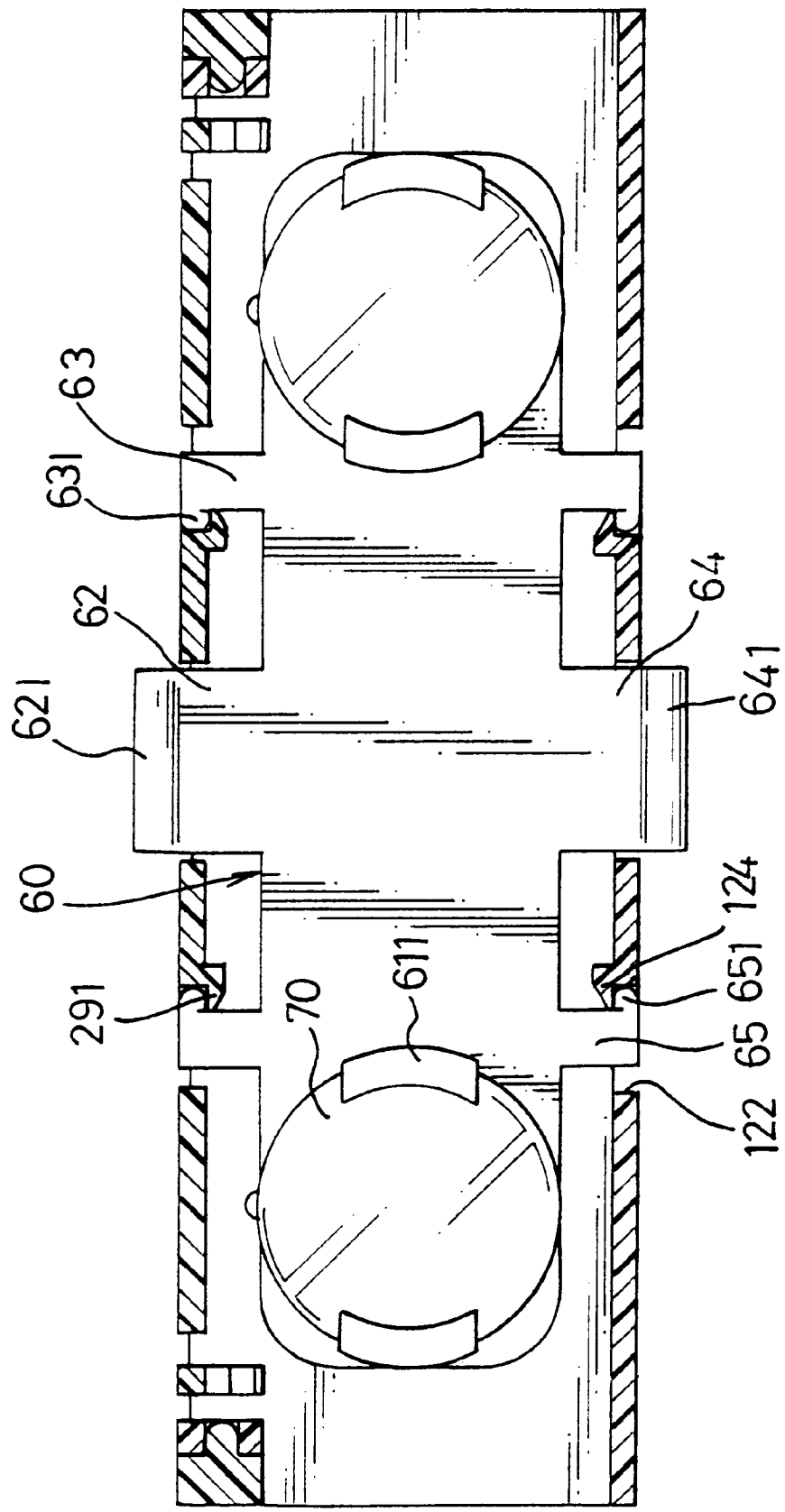
FIG. 4 is a front plan cross-sectional view of the foldable binoculars as shown in FIG. 2.

In assembly, referring to FIGS. 1 and 2 with reference to FIGS. 3 and 4, the first bracket 10 and the second bracket 20 are initially disposed in a flat manner and can then be bent to a triangular shape as shown in FIG. 1 respectively.

Each of the two second slides 65 of the adjusting member 60 can be initially pushed to be inserted into the respective guide groove 122 and each of the two first slides 63 of the adjusting member 60 can slide into the respective guide groove 29.

The first side of the second bottom plate 22 can then be pivotally mounted on the second side of the first side plate 13 by means of inserting the stub 241 into the respective pivot hole 151.

Finally, the first side of the first bottom plate 12 can be pivotally mounted on the second side of the second side plate 23 by means of inserting the stub 141 into the respective pivot hole 251, thereby assembling the entire foldable binoculars 1 as shown in FIG. 2.

By such an arrangement, the adjusting member 60 can be slidably mounted between the first side of the second bottom plate 22 and the second side of the first bottom plate 12 such that the distance between the convex lens 70 and the respective concave lens 50 can be changed arbitrarily, thereby easily adjusting the focal length of the foldable binoculars 1.

The adjusting member 60 can also be slidably mounted between the second side of the second bottom plate 22 and the first side of the first bottom plate 12, thereby arbitrarily adjusting the focal length of the foldable binoculars 1, wherein the assembling process thereof is the same as described above and will not be further discussed in detail.

Each of two convex lenses 70 can also be received in a corresponding one of the two objective carriers 30 such that the distance between the convex lens 70 and the respective concave lens 50 is fixed, thereby fixing the focal length of the foldable binoculars 1.

Referring now to FIGS. 3 and 5 with reference to FIG. 1, a shear stress can be exerted on the first bracket 10 and the second bracket 20 along a direction as indicated by the arrows shown in FIG. 3 such that each of the elastic pieces 26 initially received in a first retaining recess 171 can be urged to be received in a second retaining recess 171 of the respective retaining base 17, and each of the elastic pieces 16 initially received in a first retaining recess 271 can be urged to be received in a second retaining recess 271 of the respective retaining base 27 such that the first and second brackets 10 and 20 can be expanded from a first position as shown in FIG. 3 to a second position as shown in FIG. 5, thereby collapsing the foldable binoculars 1.

Accordingly, by such an arrangement, each of the assembling parts of the foldable binoculars takes up a small space and can be packaged and transported individually, thereby reducing the volume they occupy and thereby decreasing the cost in transportation. In addition, the foldable binoculars can be easily assembled by a user, thereby reducing the cost for assembling it. Further, the foldable binoculars can be collapsed easily, thereby facilitating a user to take it.

It should be clear to those skilled in the art that further embodiments may be made without departing from the scope and spirit of the present invention.

What is claimed is:

1. Foldable binoculars comprising:
   a substantially L-shaped first bracket (10) including a first bottom plate (12) having a first side and a second side, and a first side plate (13) having a first side extending from said second side of said first bottom plate (12) and a second side, said first side plate (13) defining two spaced first viewing holes (131);
   a substantially L-shaped second bracket (20) including a second bottom plate (22) having a first side pivotally connected with said second side of said first side plate (13) of said first bracket (10) and a second side, and a second side plate (23) having a first side extending from said second side of said second bottom plate (22) and a second side pivotally connected with said first side of said first bottom plate (12) of said first bracket (10), said second side plate (23) defining two spaced second viewing holes (231) each aligning with a corresponding one of said two first viewing holes (131);

two concave lenses (50) each mounted on a corresponding one of said two second viewing holes (231);

an adjusting member (60) movably mounted between said first bracket (10) and said second bracket (20) and defining two spaced third viewing holes (61) each aligning with a corresponding one of said two first viewing holes (131) and each aligning with a corresponding one of said two second viewing holes (231); and two convex lenses (70) each detachably mounted on a corresponding one of said two third viewing holes (61).

2. The foldable binoculars in accordance with claim 1, wherein said second side of said first side plate (13) includes two end portions each formed with a pivot base (15) transversely defining a pivot hole (151), and said first side of said second bottom plate (22) includes two end portions each formed with a pivot ear (24) which is formed with a stub (241) pivotally received in said pivot hole (151) of a corresponding one of said two end portions of said second side of said first side plate (13).

3. The foldable binoculars in accordance with claim 2, wherein each of said two end portions of said second side of said first side plate (13) is formed with a substantially T-shaped retaining base (17) defining two retaining recesses (171), and each of said two end portions of said first side of said second bottom plate (22) is formed with an elastic piece (26) received in one of said two retaining recesses (171) of a corresponding one of said two end portions of said second side of said first side plate (13).

4. The foldable binoculars in accordance with claim 1, wherein said second side of said second side plate (23) includes two end portions each formed with a pivot base (25) transversely defining a pivot hole (251), and said first side of said first bottom plate (12) includes two end portions each formed with a pivot ear (14) which is formed with a stub (141) pivotally received in said pivot hole (251) of a corresponding one of said two end portions of said second side of said second side plate (23).

5. The foldable binoculars in accordance with claim 4, wherein each of said two end portions of said second side of said second side plate (23) is formed with a substantially T-shaped retaining base (27) defining two retaining recesses (271), and each of said two end portions of said first side of said first bottom plate (12) is formed with an elastic piece (16) received in one of said two retaining recesses (271) of a corresponding one of said two end portions of said second side of said second side plate (23).

6. The foldable binoculars in accordance with claim 1, wherein said first side of said second bottom plate (22) defines two spaced first guide grooves (29), said second side of said first bottom plate (12) defines two spaced second guide grooves (122) each aligning with a corresponding one of said two first guide grooves (29), and said adjusting member (60) includes a first side formed with two first slides (63) each slidably received in a corresponding one of said two first guide grooves (29), and a second side formed with two second slides (65) each slidably received in a corresponding one of said two second guide grooves (122).

7. The foldable binoculars in accordance with claim 6, wherein each of said two first guide grooves (29) includes a guide track (291) formed therein, and each of said two first slides (63) is formed with a lug (631) guided by said guide track (291) of a corresponding one of said two first guide grooves (29).

8. The foldable binoculars in accordance with claim 6, wherein each of said two second guide grooves (122) includes a guide track (124) formed therein, and each of said two second slides (65) is formed with a lug (651) guided by said guide track (124) of a corresponding one of said two second guide grooves (122).

9. The foldable binoculars in accordance with claim 1, wherein said first side of said second bottom plate (22) defines a first opening (28), said second side of said first bottom plate (12) defines a second opening (120) aligning with said first opening (28), and said adjusting member (60) includes a first side formed with a pushing piece (62) slidably received in said first opening (28), and a second side formed with a second pushing piece (64) slidably received in said second opening (120).

10. The foldable binoculars in accordance with claim 9, wherein said first pushing piece (62) is formed with a large head (621).

11. The foldable binoculars in accordance with claim 9, wherein said second pushing piece (64) is formed with a large head (641).

12. The foldable binoculars in accordance with claim 1, wherein an elongate slit (11) is defined between said second side of said first bottom plate (12) and said first side of said first side plate (13).

13. The foldable binoculars in accordance with claim 1, wherein an elongate slit (21) is defined between said second side of said second bottom plate (22) and said first side of said second side plate (23).

14. The foldable binoculars in accordance with claim 1, wherein each of said two third viewing holes (61) includes two substantially L-shaped arcuate hooks (611) each radially extending inwardly for retaining a corresponding one of said two convex lenses (70) therein.

15. The foldable binoculars in accordance with claim 1, further comprising two eyepiece carriers (40) each fixedly mounted on said second side plate (23) of said second bracket (20) for retaining a corresponding one of said two concave lenses (50) therein.

* * * * *